(12) United States Patent
Srivastava

(10) Patent No.: US 10,339,093 B2
(45) Date of Patent: Jul. 2, 2019

(54) USB INTERFACE USING REPEATERS WITH GUEST PROTOCOL SUPPORT

(71) Applicant: Intel Corporation, Santa Clara, CA (US)

(72) Inventor: Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 15/083,518

(22) Filed: Mar. 29, 2016

(65) Prior Publication Data

US 2017/0286360 A1    Oct. 5, 2017

(51) Int. Cl.
*G06F 13/42*    (2006.01)
*G06F 13/40*    (2006.01)
*G06F 13/38*    (2006.01)

(52) U.S. Cl.
CPC ........ *G06F 13/4295* (2013.01); *G06F 13/385* (2013.01); *G06F 13/4022* (2013.01)

(58) Field of Classification Search
CPC . G06F 13/4295; G06F 13/385; G06F 13/4022
USPC .................. 710/11, 14, 16, 31, 33, 105, 106
See application file for complete search history.

(56) References Cited

U.S. PATENT DOCUMENTS

| | | | |
|---|---|---|---|
| 6,279,140 B1 * | 8/2001 | Slane .................... | H04L 1/0045 714/807 |
| 7,801,184 B2 * | 9/2010 | Paulson .................. | H04L 25/14 370/510 |
| 9,748,788 B2 * | 8/2017 | Sporck .................... | H02J 7/007 |
| 2008/0082286 A1 * | 4/2008 | Nagano ................. | G06F 11/221 702/120 |
| 2010/0070659 A1 * | 3/2010 | Ma ........................ | G06F 13/385 710/14 |
| 2011/0022826 A1 | 1/2011 | More et al. | |
| 2012/0072634 A1 * | 3/2012 | Mueller ............. | G06F 13/4072 710/305 |
| 2012/0170342 A1 * | 7/2012 | Manning .............. | H05K 5/0278 363/146 |
| 2013/0009470 A1 * | 1/2013 | Chuang ................. | H02J 7/0065 307/31 |
| 2014/0006674 A1 * | 1/2014 | Chan ................... | G06F 13/4027 710/313 |
| 2014/0244852 A1 | 8/2014 | Goh et al. | |

(Continued)

FOREIGN PATENT DOCUMENTS

WO    2007018365 A1    2/2007

OTHER PUBLICATIONS

PCT International Search Report, PCT Application No. PCT/US2017/015545, dated May 29, 2017, 3 pages.

*Primary Examiner* — Farley Abad
*Assistant Examiner* — Henry W Yu
(74) *Attorney, Agent, or Firm* — International IP Law Group, P.L.L.C.

(57) ABSTRACT

An example system for side band communication can include a processor, a system-on-chip (SOC), and a repeater communicatively coupled to the processor and the SOC. The repeater can receive packets from a first transceiver. The repeater can also detect a pattern in the packets to identify a guest protocol. The repeater can further send the packets from the first transceiver to the SOC via a second transceiver based on the identified guest protocol.

25 Claims, 12 Drawing Sheets

(56) References Cited

U.S. PATENT DOCUMENTS

| | | | |
|---|---|---|---|
| 2015/0137791 A1* | 5/2015 | Remple | G01N 27/00 324/76.11 |
| 2015/0156089 A1* | 6/2015 | McCleland | H04L 43/08 307/1 |
| 2015/0261714 A1* | 9/2015 | Talmola | G06F 13/4081 710/313 |
| 2016/0014700 A1* | 1/2016 | Taha | G06F 1/3212 455/574 |
| 2016/0162430 A1* | 6/2016 | Ma | G06F 13/385 710/313 |

* cited by examiner

USB INTERFACE USING REPEATERS WITH GUEST PROTOCOL SUPPORT

TECHNICAL FIELD

The present techniques relate generally to the processing of guest protocols via USB devices. More specifically, the present techniques relate to supporting guest protocols in an embedded universal serial bus (USB) 2.0 repeater.

BACKGROUND ART

Computing connectors that can carry data and power may need to serve a number of voltages and protocols for a number of different connected devices. For example, a connector can implement a number of switches at the platform level to allow a connected device to interact with a host through any number of guest protocols.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
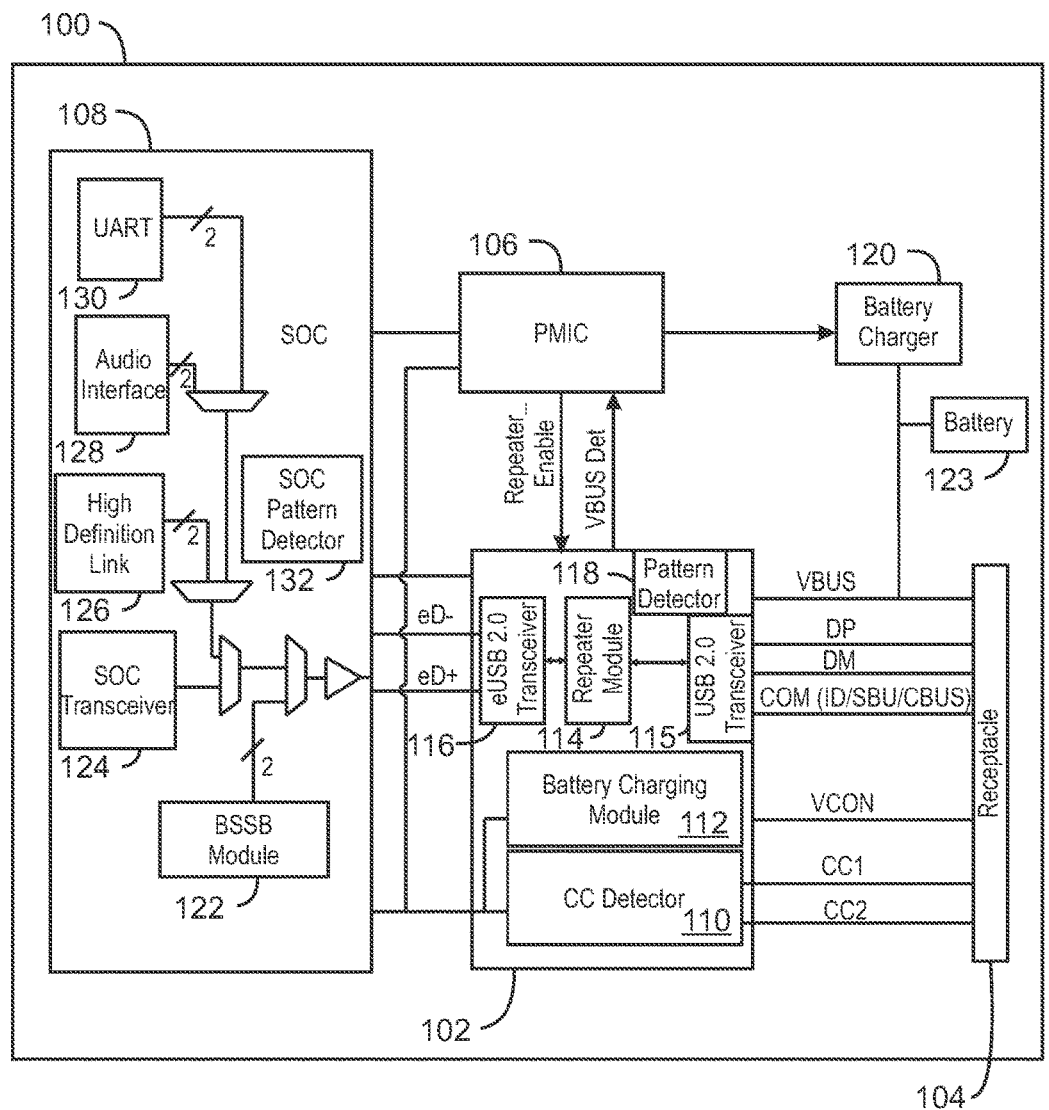
FIG. 1 is a block diagram of an example system including a repeater that supports guest protocols.

As described above, a computing connector may need to serve a number of voltages and/or guest protocols. For example, some cables supporting guest protocols can include USB Type-C, supporting high voltage protocols such as universal asynchronous receiver transmitters (UART), and audio protocols. Additionally, Type-C cables can support low voltage 1V protocols such as battery charging (BC) v.1.2, boundary scan side band (BSSB) signaling, super mobile high definition link (SMHL), and mobile high definition Link (MHL). The USB Type-C plug and connector are defined according to the USB Type-C Specification 1.0, released Aug. 11, 2014. Various connection types may thus be realized through alternate modes, as enabled by the USB Type-C Specification. In particular, the USB Type-C Specification enables signal pins to be reassigned for purposes other than a USB 2.0 data transmission. These reassignments are referred to as alternate modes. Each USB Type-C Port can support zero or more alternate modes. In embodiments, an alternate mode, also referred to herein as a guest protocol, may be a form of operation where data is transmitted and received across pins and/or hardware, where the pins and/or hardware are indicative of a first protocol while the data is packetized, encoded/decoded, or otherwise communicated according to a second protocol.

In example connectors with a higher numbers of pins, such as Type-C cables, problems around integration and protocol management of a repeater into a SOC can include repeater performance degradation issues. The repeater performance degradation issues can be due to the addition of various switches included to enable additional protocols such as guest protocols. Signal integrity and jitter budget limits of a USB with a repeater can also be difficult to meet. Although using a USB with a repeater, correction of electronic errors can be made possible through the use of filtering techniques, including pre-emphasis or de-emphasis techniques that use an additional 5 milliwatts (mW) at one switch. For example, techniques can include intentional alteration of the amplitude-vs.-frequency characteristics of a signal to reduce adverse effects of noise in a communication system. However, the use of pre-emphasis in the USB connector with a repeater through power boosting for more than one switch may result in additional degradation of battery life time can in the overall system.

Furthermore, problems around integration and protocol management of multiple switches and pins can become costly as each switch or pin adds another multiple of expense to a system. Integration of a large number of switches or pins can be difficult as support of higher voltage can limit SOC scalability and integration. In this disclosure, the present techniques provide a platform solution allowing integration for a number of voltages with without impacting repeater operation.

In the present disclosure, a repeater can include a repeater for supporting various guest protocols using signalers to send and receive data to and from the SOC and retain guest protocol at a eUSB 2.0 Standard DP/DM Connector. As used herein, a guest protocol or proprietary protocol which used DP/DM pins for data transmission is one that is not natively supported by the repeater. For example, a USB Type-C repeater can be used to transmit data according to various guest protocols, including Thunderbolt™. The presently disclosed techniques can also include guest protocol pattern packet detection and high voltage analog detection in the repeater. The SOC can include a low voltage transceiver for supporting guest protocol which can use low voltage signaling for control signaling to a PMIC or another SOC.

As used herein, a repeater may include hardware, software, or any combination thereof that is to provide an interface between a processing device and a peripheral device. Additionally, repeaters may be electronic components that are to convert a USB signal into another signal, and transmit it over some medium such as Cat 5 cables, Wireless (802.11g) bands, or a Fiber Optic medium. In some examples, communications can interface between systems and devices according to the Embedded Universal Serial Bus 2.0 (eUSB 2.0 Standard) Specification from the Physical Layer Supplement to the USB Revision 2.0 Specification, dated Aug. 1, 2014.

The present techniques enable multiple systems to transmit and receive data according to multiple protocols through a single repeater that supports multiple guest protocols. In embodiments, a repeater can receive data from a device connected through a USB 2.0 enabled cable and then forward that data through a eUSB 2.0 interface to a SOC. Similarly, a repeater can include receive data from the SOC and forward data to a device through a USB cable such as a Type-C cable.

A repeater that transmits and receives data according to the eUSB Specification can integrate high voltage 10, for example, 3.3 volts (V) at system on a chip (SOC) level. In some examples, a repeater can use the eUSB 2.0 Standard to define a low voltage protocol between the SOC and a repeater. This integration of multiple voltages and protocols enables scalability of the SOC across future generations and processes. Repeaters also can support guest protocols through suitable cables and protocols including the eUSB 2.0 Standard. For example, a repeater using side band communication such as a USB system can support one or more guest protocols. To enable a guest protocol over USB, pins in the USB system may be connected to high speed switches to act as multiplexers (muxes) on the data plus (DP) and data minus (DM) signal paths. In an example, these DP/DM paths and high speed switches can operate in hardware on a system and can accordingly operate across abstractions, user profiles, states, or instances of an active system. The repeater using side band communication can include a transceiver of guest protocol input/output (IO), the transceiver to aid in the integration of the repeater using side band communication as part of the SOC. Repeater integration into the SOC can also occur through a suitable platform solution based on the SOC support of an incoming I/O voltage.

In some examples, connector types for the repeater using side band communication can include a number of form factors, protocols, and designs including a Type-C connector. For example, with a Type-C connector, a repeater using side band communication can include high voltage support and a higher number of pins for data transfer to the device connected through USB cable.

In an example of the present techniques, repeaters, such as repeater that implements embedded USB 2.0, can signal for support for one or more guest protocols. The eUSB 2.0 Standard enables an SOC to include both a low voltage transceiver for a number of protocols that can be combined and communicated to a repeater. The repeater can have a high voltage input/output (I/O) using eUSB 2.0 standard signaling to accommodate protocols for devices sending and receiving data with high voltage communication signals. The repeater can also include a detection mechanism to send a data packet upon detection or receipt of a data packet through a USB DP/DM pin. Receipt of the packet can retain signaling used in the guest protocol. High voltage detection in the repeater that can be integrated into a system level can include, for example, detection protocols to detect power and communication protocols including integrated battery charge (BC) 1.2 or Type-C USB high voltage detection protocols. The high voltage detection in the repeater can include each protocol detector into the repeater. Thus, the use of additional components at a platform level of the SOC is avoided. In addition, a low voltage communication input receiver in between an SOC/Power Management Integrated Circuit (PMIC) and repeater, can be used to avoid, at least in part, a duplicate high voltage I/O input receiver. For example, the low voltage communication input receiver may be a 1V Infinity Computers and Communication Company connector.

In the following disclosure, numerous specific details are set forth, such as examples of specific types of processors and system configurations, specific hardware structures, specific instruction types, specific system components, etc. in order to provide a thorough understanding of the present disclosure. It can be apparent, however, to one skilled in the art that these specific details need not be employed to practice the presently disclosed techniques. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the presently disclosed techniques.

FIG. 1 is a block diagram of an example system 100 including a repeater 102 that supports guest protocols. The repeater 102 can be part of a larger platform component including a receptacle 104 to hold and interface with a connected device, storage, or cable. The repeater 102 connects to a power management integrated circuit (PMIC) 106 to receive and direct power to a system on a chip (SOC) 108. The SOC 108 can be a processor integrated with a storage device or any other suitable means for storing and transmitting data.

The repeater 102 can include connections to configuration channels (CC) CC1 and CC2 through a CC detector 110. The CC detector 110 can detect if either of the CC channels are active and also an orientation of a device or plug using both channels CC1 and CC2. The repeater 102 can also include a battery charging module 112 to regulate the power needed at the repeater 102. The repeater 102 can also supply signals and power across the appropriate channels while also detecting what kind of charger or host has connected to the repeater 102. By determining what charger or host has connected, the repeater 102 can also control charging based on a system battery requirement. The repeater 102 can also include a repeater module 114 to provide instructions and data to the components of the repeater 102. The repeater module 114 can be connected to a USB 2.0 transceiver 115 used to communicate with a connected device, storage, or other platform through the receptacle 104. The repeater module 114 can also be connected to an embedded eUSB 2.0 transceiver 116 that interfaces with the SOC 108. Communication between the USB 2.0 transceiver 115 and the repeater 102 can use data plus (DP) and data minus (DM) pins. Communication between the SOC 108 and the embedded USB (eUSB) 2.0 transceiver 116 of the repeater 102 can use embedded data plus (eD+) and embedded data minus (eD−) pins. The USB 2.0 transceiver 115 can also receive data from a receptacle 104 through a communication line (COM) that can include information in a variety of protocols. For example, the protocols may include any number of guest protocols. In some examples, the COM pin can be mapped to one of three pins including non-Type C pin (ID) for non-Type-C communication, a Type-C pin (SBU) used for sideband communication, or a guest protocol pin (CBUS) such as an MLH or an SMHL pin. The repeater 102 can detect the guest protocol on the CBUS pin, which can also be used as a sideband communication pin.

The repeater 102 can also include a pattern detector 118 to be used to identify and match a pattern of a particular protocol to be repeated by the repeater 102. The pattern detector 118 can detect a pattern being sent through the CC pins, while a voltage detector (not shown) can monitor the DP/DM pins at the USB 2.0 transceiver 115. These detections can be used to determine a protocol to use at the repeater module 114 to handle, transmit, or adequately power a particular protocol incoming to the repeater 102. For example, the repeater module 114 may include support for any number of guest protocols. The flexibility provided by the repeater 102 in handling multiple protocols allows multiple devices using different protocols to attach and communicate through the repeater 102 to the SOC 108 without additional hardware. The repeater 102 can also provide power adjustments through a Voltage Bus (VBUS) detection line to the PMIC 106. The repeater 102 can provide power adjustments to the PMIC 106 so the PMIC 106 can instruct a battery charger 120 to provide charging current at the VBUS line or can otherwise charge a battery 123 through VBUS line. The PMIC 106 can also enable the repeater 102 to power on upon detection of voltage at the VBUS line.

As disclosed herein, the integration of various input detection at the repeater 102 can include protocol detection including battery charging detection as defined in the BC 1.2 Specification and charging detection as defined in the USB Type-C Specification using CC pin detection and communication. The repeater 102 may use these two different methods of detection to enable communication through multiple hardware connections including USB pin DP/DM or Type-C connector pin CC pins. These multiple connection types result in two detection types allowing multiple hardware communication methods through a single repeater 102.

Low voltage communication between a repeater 102 and the SOC 108 may be implemented between a low voltage eUSB 2.0 transceiver 116 and an SOC transceiver 124. This may also enable Audio and High Definition link or modules such as a Boundary Scan side band (BSSB) signaling module 122 to communicate through embedded USB to the SOC 108. The SOC 108 can thus receive or transmit signals via the SOC transceiver 124. The SOC 108 can also expand onto a high definition link 126. For example, the platform can include a super MHL transceiver or other similar data links for support and communication. In some examples, an audio transceiver can be connected to an audio interface 128 of the SOC 108 while the MHL can use at least two switches—one switch for BSSB signaling and another switch for a universal asynchronous receiver/transmitter (UART) 130. An SOC pattern detector 132 can be used to determine a particular protocol or switch to use. In an example, a selection logic between functional and guest protocol (MHL, UART, BC, AUDIO etc.) can be executed upon system 100 wake or through the repeater 102 upon wake from suspend, low power, or the attachment of a cable at the receptacle 104. The repeater module 114 may repeat received signals in various guest protocols through eUSB 2.0 standard signaling if not in eUSB 2.0 Standard functional mode. For example, a guest protocol may include AUDIO, BC, UART, and MHL protocols. While each of these protocols are non USB 2.0 protocols, each can still use USB 2.0 pins for data communication through the presently disclosed techniques. Further, a functional protocol, referring to native USB 2.0 communications, may also be simultaneously supported. In some examples, the repeater module 114 can include state machines that can define how to differentiate from one protocol and another and enable an SOC level multiplexer to forward data based on the detections to USB 2.0 pins 104 through the repeater 102. For example, if it is found that a USB 2.0 device is connected through the repeater 102, then USB 2.0 communication can be used via a functional protocol communication.

As shown, FIG. 1 the repeater 102 may also be responsible for pattern detection in part by using the pattern detector 118. Patterns can be detected differently depending on the particular protocol being detected. For example, the BSSB protocol can be detected through a sideband use (SBU) pin for Type-C connector detections and through DP/DM lines for non Type-C cable detections. In an example, an audio protocol can be detected through a pull-down termination Resistor (Ra) through a CC Pin detection of a Type-C cable. An audio protocol can also be detected through a DP/DM voltage detection during non-Type-C cable detection. In the case of digital audio, the pattern detector 118 can detect digital patterns through CC pin or DP/DM pin to determine Digital Audio. In another example, the pattern detector 118 can detect a high-definition link through a side band (SBU) pin through pattern detection. The presence of a high-definition link can also be detected when a Type-C connection is used. When a non-Type-C connection connects to the repeater 102, the presence of a high-definition link can be detected through an on the go (OTG) pin or a CBUS (COM) pin. Further protocol detections can be made through communication channel (CC) detection, orientation detection, accessory mode detection, or any combination thereof.

In some examples, the repeater module 114 can include a glue logic (not shown) for protocol selection including guest and functional selection. Using the glue logic, a packet of data can be forwarded to the SOC 108 through eUSB 2.0 standard signaling. In some examples, the repeater module 114 can configure the transceiver 116 via the glue logic upon indication from the SOC 108. In some examples, the signaling can also instigate a self-detection causing the forwarding of a packet through DP/DM pins. The repeater module 114 implementing the glue logic can act as an interface in between eUSB 2.0 standard signaling at the eUSB 2.0 transceiver and USB 2.0 Standard signaling at the USB 2.0 transceiver 116. The repeater module 114 implementing glue logic can communicate with the PMIC 106 and the SOC 108 through any suitable low speed chip-to chip communication, such as through an Inter Integrated Circuit (I2C) or through an Improved Inter integrated circuit (I3C), or any other low speed interface for interrupt generation. The glue logic can also enable the repeater module 114 to communicate with the PMIC 106 and SOC 108 by controlling charging current.

Figure 2:
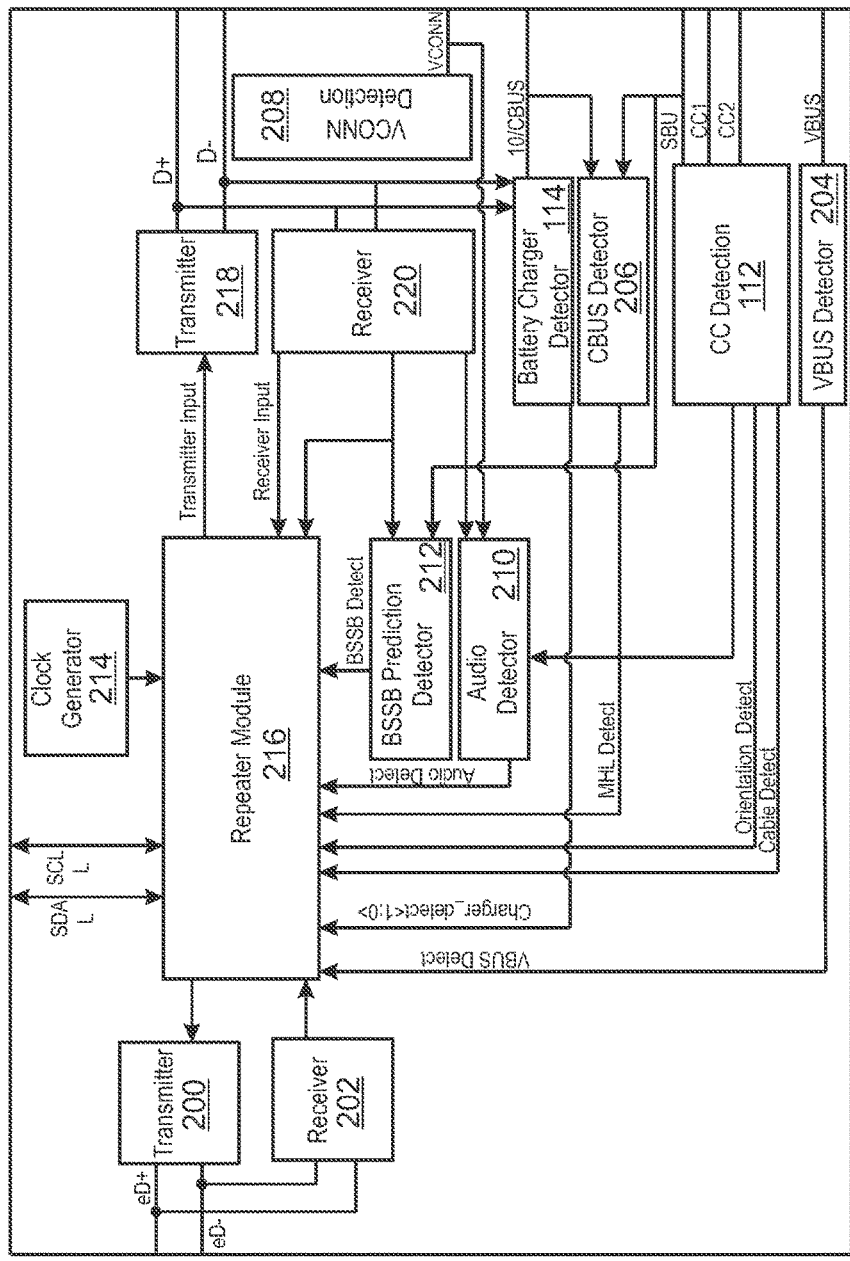
FIG. 2 is a schematic block diagram of an example repeater that supports guest protocols.

FIG. 2 is a schematic block diagram of the example repeater 100 that supports guest protocols. Like numbered items are as described in FIG. 1.

This disclosure details, in part, the process of enabling guest protocol detection using the eUSB 2.0 standard in a repeater 102 at a platform. FIG. 2 shows how a repeater 102 can detect various guest protocols or USB 2.0 protocols and differentiate and communicate to the SOC about the specific protocols detected.

The repeater 102 can include components such as a transmitter 200 and a receiver 202, coupled to SOC 108, for transmitting electrical signals. The transmitter 200 and receiver 202 can use embedded data (eD+/eD−) pins when communicating with a system on a chip (SOC). The transmitter 218 and receiver 220 can transmit or receive data, respectively, through USB data positive (D+) pin and USB data minus (D−) pins when transmitting or receiving to or from devices connected through USB 2.0 cables or embedded devices.

The repeater 102 can include a VBus Detector 204 to detect power or more specifically a voltage from a power line (VBUS) 204 connected to a plug receptacle that can receive a physical connector. The repeater 102 can also include a CBUS detector 206 to detect communication from an SBU pin. Signal detected on a CBUS detector 206 can be transmitted to the repeater 102 through a High definition Link detect line. The repeater 102 can also include a VCONN detector 208 to detect a type of power connection from a voltage connection (VCONN) line for a Type-C Connector. The VCONN line can also connect to an audio detector 210 to detect if an audio signal is being conveyed to the repeater 102. A signal detected at the audio detector can be passed to a repeater module 216 through an audio detect line. The audio signals detected at an audio detector 210 can also come from a receiver 220 and passed to the repeater module 216 by an audio detect line.

In an example, the repeater 102 can detect the protocol being used through a number of modules for specific protocols. For example, a BSSB pattern detector 212 can be used to detect BSSB signals from a receiver 220. The BSSB pattern detector can transmit data to a repeater module 216 through a BSSB detect line. The repeater 102 can also include a clock generator 214 to keep time and detect patterns based on the signals received and how they relate to a particular frequency generated. This frequency can be passed to the repeater module 216 for use in pattern and protocol detection that can occur at the repeater module 102.

Figure 3:
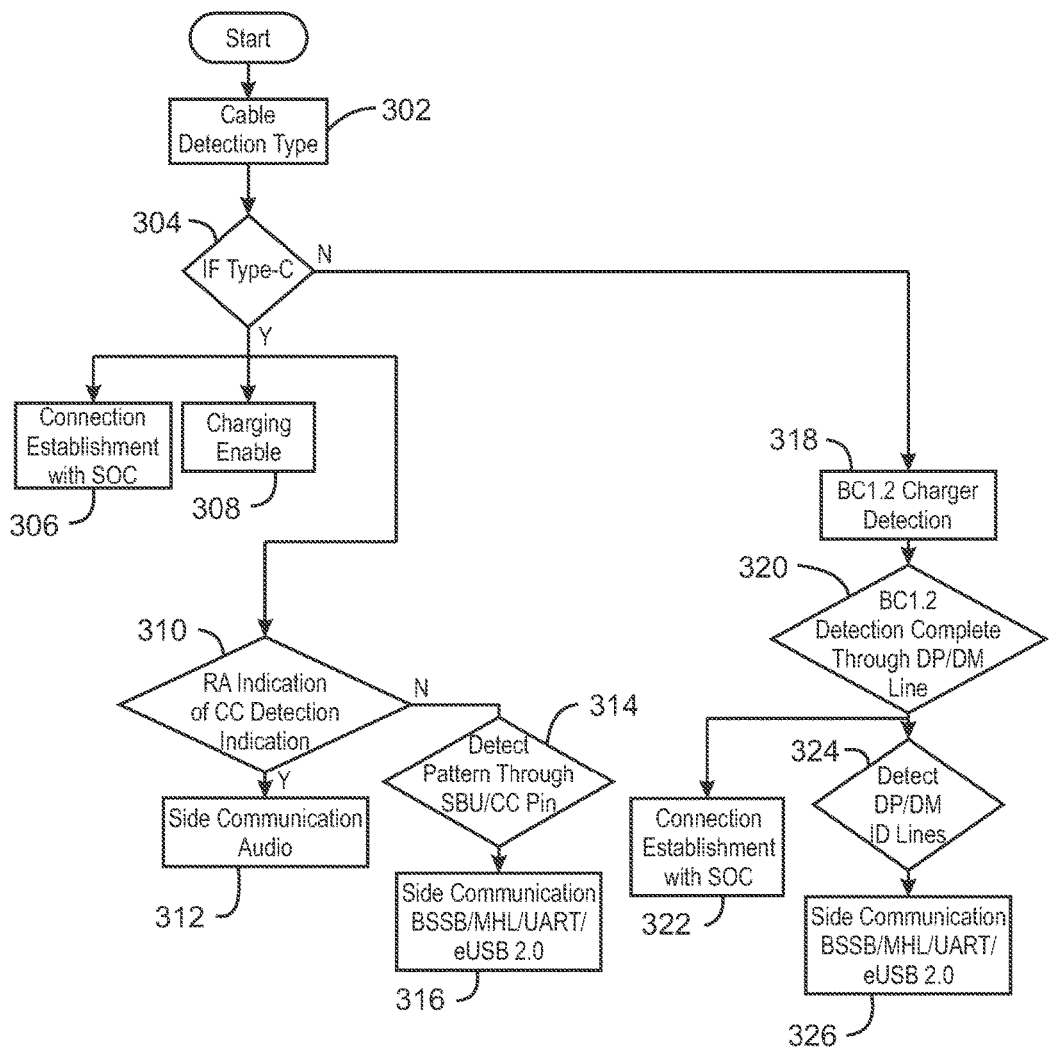
FIG. 3 is a process flow diagram of an example method for supporting a number of guest protocols in a repeater.

FIG. 3 is a process flow diagram of an example method 300 for supporting a number of guest protocols in a repeater. The method 300 shown here can show how a connector can include a repeater with multiple states to support guest and functional protocols, e.g. three states, where the states can include cable detection, charging enable and connection establishment. The process flow may begin at block 302.

In the cable detection state shown at block 302, a first repeater can check whether a cable is plugged in or not. For example, the cable can include a Type-C cable or non-Type-C cable for example micro-A, micro-B, Mini-A, Min-B, Mini-AB, and other USB connectors. If no cable is detected as plugged in to the first repeater, then the first repeater can monitor for a second type of cable. At block 302, a cable detection type is detected. The cable can be any cable used to transmit data through a USB port or receptacle. At block 304 it is determined if the cable connector is a type-C connector. If the cable connector is a Type-C cable connection, process flow may proceed to blocks 306-316. If the cable connector is not a Type-C cable connection, the process flow may proceed to block 318.

At block 306, a connection is established with a SOC through the Type-C connection. At block 308 charging or powering of a device is enabled through the Type-C connection. In a charging enable state 308 the repeater can check whether more charging current can be used or if instead a default current can be used to charge the connected device. In an example, the connector or repeater can send an indication to the PMIC 106. The PMIC 106 can instruct a battery charger to provide a charge and the charger 120 can then charge with higher charging current upon detection of a particular charging current requirement of a connected device protocol. Further elaboration of the charging enable state can be seen in FIG. 6. At block 310, it is determined if audio communication is being undertaken to the connector. This audio determination can be through detection through pulldown resistor (RA) detection through CC pins. If audio communication is detected, then the process flow may proceed to block 312, if not, process flow proceeds to block 314. At block 312, side communication can be implemented with the audio communications from the repeater using side band communication.

At block 314, a pattern for a protocol can be detected through a SBU/CC pin. The process flow may proceeds to block 316. At block 316, depending on the protocol pattern detected, side communication can proceed through the protocol detected. In an example, the protocol detected and used in sideband communication can be through BSSB, MHL, UART and functional eUSB 2.0 Standard communication.

At block 318, a Type-C cable may be determined to not be connected to the connector. If a non-Type-C Cable is detected, a connector or repeater B.C. 1.2 module of the connector can be engaged at block 318 to start charger type detection based on the BC 1.2 specification.

At block 318, detection can be made for protocol detection such as a B.C. 1.2 Charger detection though DP/DM line detections. The process flow may then proceed to block 320.

At block 320, the protocol detection is completed through monitoring of the DP and DM pins. Upon detection of a particular protocol battery charge voltage, the process can properly complete connection establishment to an SOC at block 322. In a connection establishment state of block 322 or the corresponding state for Type-C cables at block 306, signaling can be synchronized between the SOC and the repeater or connector, through signals outlined and pins shown in FIGS. 1 and 2. At block 306 and 322, for connection establishment, a eUSB 2.0 Standard repeater can be made aware of a wake presence or a component or connected device.

Process flow may also proceed to block 324. At block 324, DP/DM identification (ID) pins can be detected for signal. Depending on the detected communication across the DP/DM/ID pins, side communication can proceed at block 326 according to the protocol detected. In an example, the protocol detected can be a BSSB, MHL, UART, or a eUSB 2.0 Standard protocol and sideband communication can take place in concert with the particular protocol detected.

Figure 4:
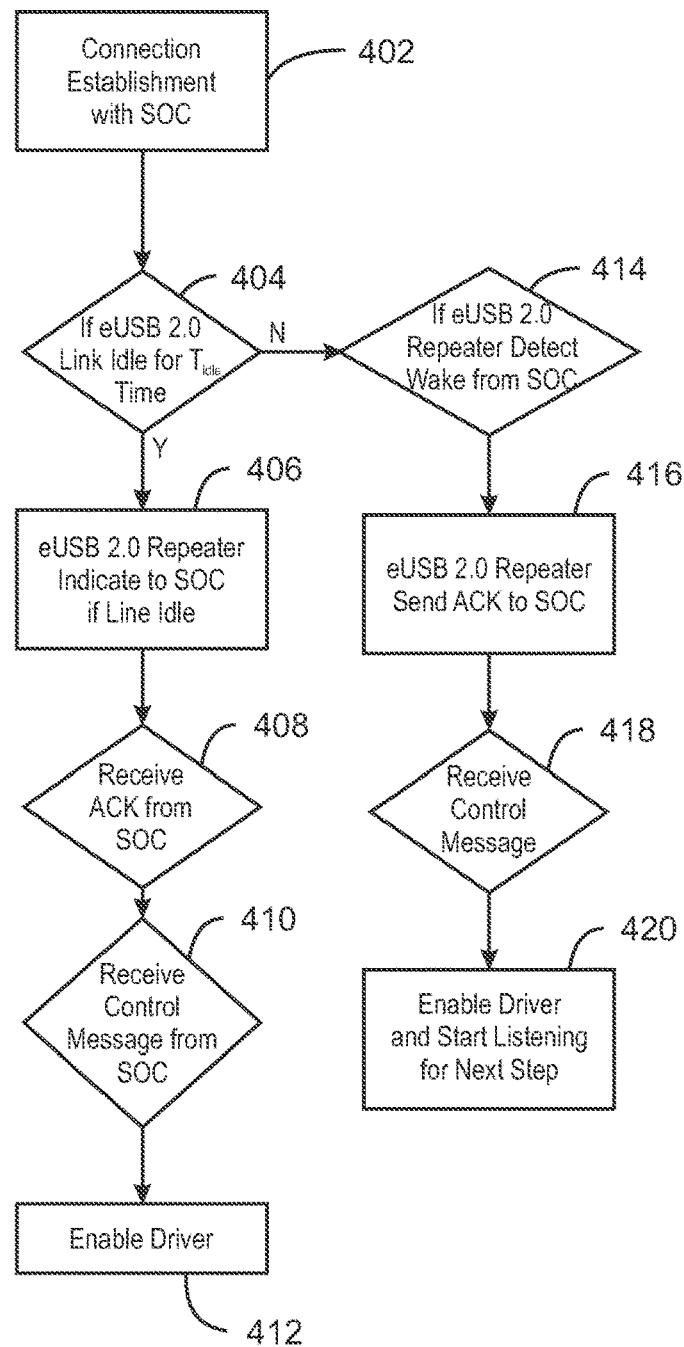
FIG. 4 is a process flow diagram showing an example method for establishing a connection between a repeater and a system-on-chip based on a detected connection type.

FIG. 4 is a process flow diagram showing an example method 400 for establishing a connection between a repeater and a system-on-chip based on a detected connection type. The process flow may begin at block 402.

At block 402, a connection establishment to a SOC can be invoked. A determination can then be made at block 404 as to if a eUSB 2.0 Standard link is idle for a time that would indicate an idle state ($T_{idle}$). If a eUSB link has been detected as idle for an amount of time $T_{idle}$, then the process flow may proceed to block 406. If not, the process flow may proceed to block 414.

At block 406, a eUSB 2.0 standard repeater can indicate that the repeater is idle to the SOC. Upon this indication being sent to the SOC, the SOC may respond with an acknowledgement message (Ack). At block 408, the eUSB 2.0 standard repeater can receive the Ack from the SOC. The SOC can be followed by a control message from the SOC. Accordingly, at block 410, the repeater can receive a control message from the SOC. The control message may include a protocol the eUSB 2.0 standard repeater can use to communicate with the SOC. For example, the control message may specify which protocol to use in future communications with the SOC. If the control message received by the repeater can be used to establish a connection and communication with the SOC with a particular protocol, the repeater may enable the driver associated with that particular protocol as shown in block 412.

As discussed above, the process flow may proceeds to block 414 if the eUSB 2.0 Standard link is not idle for $T_{idle}$. In this circumstance, the eUSB 2.0 standard link may be waiting for a signal from an SOC. At block 414, the process flow may not proceed until and if a eUSB 2.0 Standard repeater detects a wake from the SOC. At block 416, after the eUSB 2.0 Standard repeater detects the wake signal from the SOC, the repeater can send an ACK to the SOC. At block 418, the eUSB 2.0 standard repeater may receive a control message from the SOC. As discussed above for block 410, the control message received from the SOC may indicate a protocol to be used in communication. At block 420, the eUSB 2.0 standard repeater can enable an appropriate driver based on the control message from the SOC and continue listening to the line and control messages from the SOC.

Upon completion of the process of connection establishment shown in method 400, the SOC and repeater combination can both enable their pattern detection blocks to detect a pattern sent by repeater. At the same time in this method, the discussed repeater can also enable a repeater detector block to wait for pattern signature to be match as the protocol may call for this level of authentication. In an example, protocols using a match can include BSSB and MHL guest protocol. A repeater used in method 400 can also enable the repeater's voltage detection modules for suitable protocols detected. In an example, the repeater can establish connections from voltage detection in protocols based on audio and BC 1.2.

No matter the connection establishment or protocol establishment, side communication through eUSB 2.0 Standard can depend on the timing of a Wake, Low Power mode, or Cable detection. In each of these examples, a repeater can wait for a pattern to be detected at a sideband use (SBU) pin or ID pin. In an example, the repeater can also detect the RA indication through CC pin, DP, and DM pins. In an example, upon a repeater's detection of a pattern or analog voltage, the repeater can then indicate the guest protocol it may then configure to enable proper communication. In an example, the repeater can start configuring its transceiver in a first mode such as a guest mode. In an example, these guest modes can include MHL, Audio, BSSB, UART, BC 1.2, or functional protocols.

Figure 5:
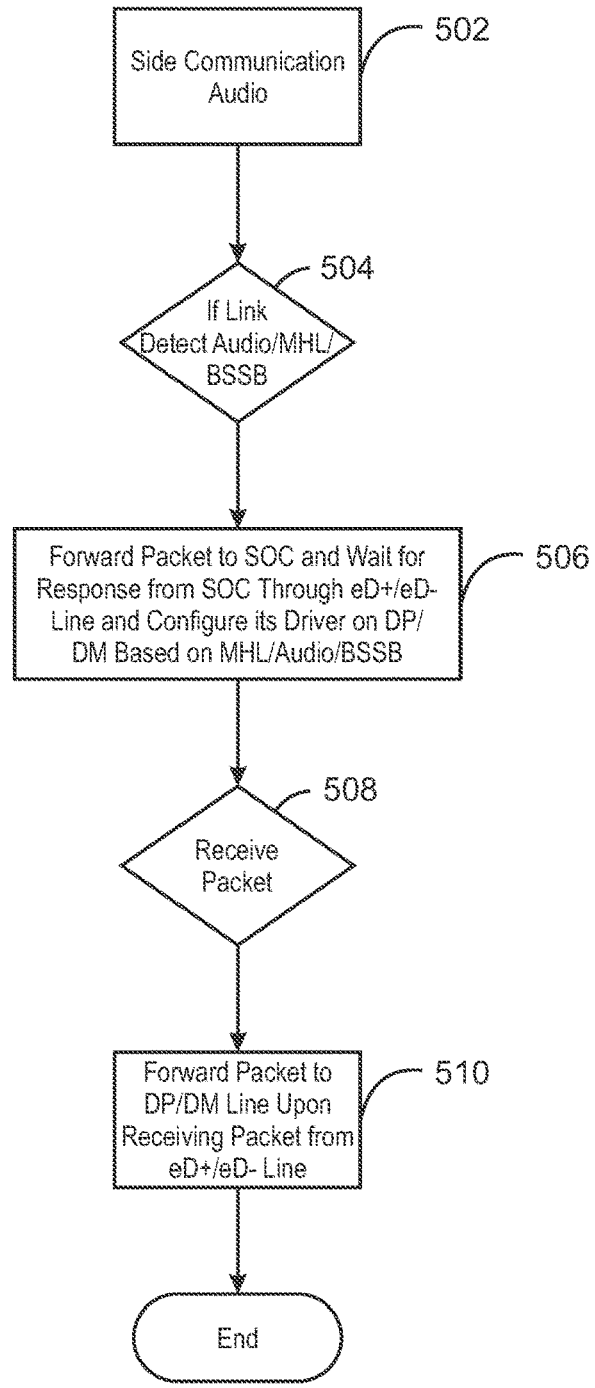
FIG. 5 is a process flow diagram showing an example method to support a detected guest protocol using a repeater.

FIG. 5 is a process flow diagram showing an example method 500 to support a detected guest protocol using a repeater. The process flow may begin at block 502.

As discussed in method 500, a repeater can forward a received packet and information to the SOC through eUSB 2.0 standard signaling. The SOC can detect the packet type from the sent packet, and afterwards the SOC can configure a transceiver or a receiver through the same signaling. An eUSB 2.0 standard repeater using a register access protocol for indication of a protocol for either BC or Audio protocols to use to forward packets for BSSB and MHL guest protocols.

In an example, the side band communication can be shown in FIG. 5 using a protocol initiated in the systems disclosed above in FIGS. 1 and 2. Upon direction from software SOC, a eUSB 2.0 standard physical layer can use control messaging signaling to indicate to a eUSB 2.0 standard repeater what particular protocol the repeater may be asked to support. In an example, the eUSB 2.0 standard repeater can detect a control message and configure a transceiver for a guest protocol mode.

At block 502, a side communication for audio can begin. At block 504, a determination is made whether a eUSB 2.0 Standard link detects an Audio, MHL, or BSSB protocol packet or signal. In response to a eUSB 2.0 standard link detecting a signal from one of these protocols, the process flow may proceed to block 506. At block 506, the packet or data received at the link can be forwarded to the SOC. After forwarding, the repeater may wait for the SOC to send a response through the eD+/eD− pins in order to configure the driver of the repeater on DP/DM based on the detected protocol. For example, the detected protocol can be MHL, Audio, or BSSB protocol.

At block 508, a packet can be received from the SOC. This packet can be addressed to the receiver from the SOC to configure the receiver pins following the configuration of the repeater. As part of this configuration, the received packet can be forwarded from the DP/DM line upon receipt of a packet of data from an eD+/eD− line as shown in block 510.

The process described in blocks 502-510 can be used to enable side communication for an audio protocol. However, for non-Type-C cables, if the pattern is detected on an ID pin, then the process may proceed with an MHL protocol packet and configuration. For non-type C cables, if the pattern is detected through a DP/DM voltage detection, then the process may proceed with the Audio protocol packet and configuration shown in FIG. 5. For non-Type-C cables, if no pattern is detected on either an ID pin or through a DP/DM voltage detection, then the process may proceed with a eUSB 2.0 standard protocol packet and configuration.

For Type-C cable connections, a pattern can be detected at SBU/CC pins and through the decoding of MHL. If a pattern is detected on CC, then a packet and configuration may be sent through an audio protocol mode. If no pattern is detected on CC, then the process may proceed with a USB UART configuration.

Figure 6:
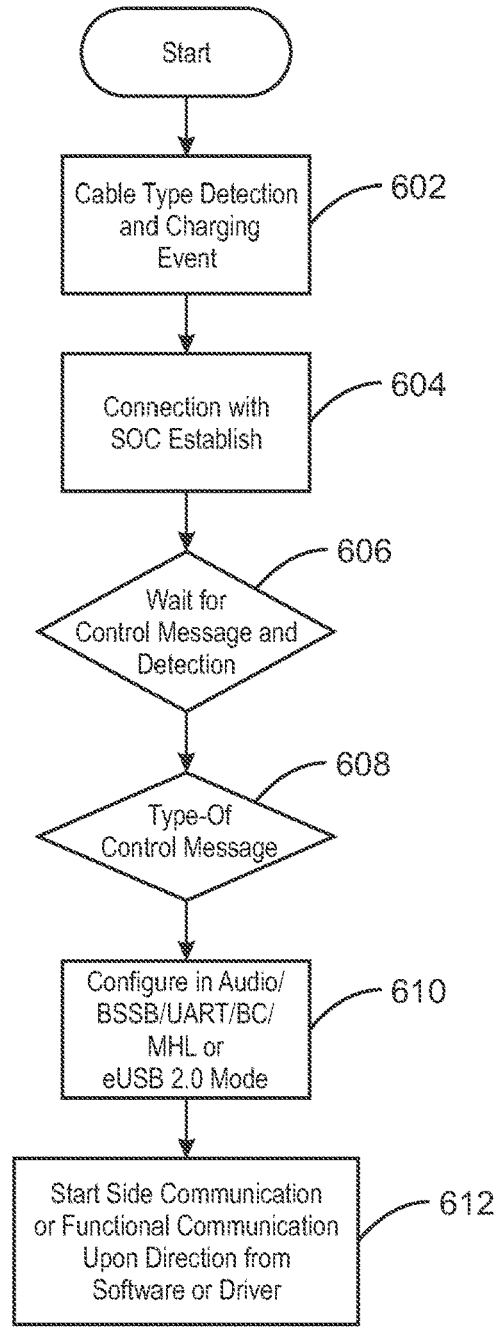
FIG. 6 is a process flow diagram of an example method to control a repeater through software or a driver.

FIG. 6 is a process flow diagram of an example method 600 to control a repeater through software or driver. The process flow may begin at block 602. As discussed below, the communication can be through eUSB 2.0 standard protocols and may be implemented by a software driver or driver driven configuration. In one example, the driver driven configuration can be sent by the SOC through a control message as further discussed below in FIG. 7.

At block 602, a cable type detection and a charging event may be performed. Upon cable detection, the process flow may proceed to block 604 where a connection with the SOC may be established. This connection can be used to push and receive control messages. At block 606, the repeater can wait for a control message and detection of a protocol. An SOC can send a control message to a repeater that can be received and interpreted. At block 608, the type control message can be interpreted based on the received packets of information from the SOC. At block 610, the result of the interpreted control message can be used to configure the repeater to match the protocol indicated by the control message. For example, the protocol can be an audio, BSSB, UART, BC, MHL or a eUSB 2.0 standard protocol mode. At block 612, the repeater can start a side communication or a functional communication protocol upon direction from a software of the SOC or from a message passed to the repeater and by an activated driver.

Figure 7:
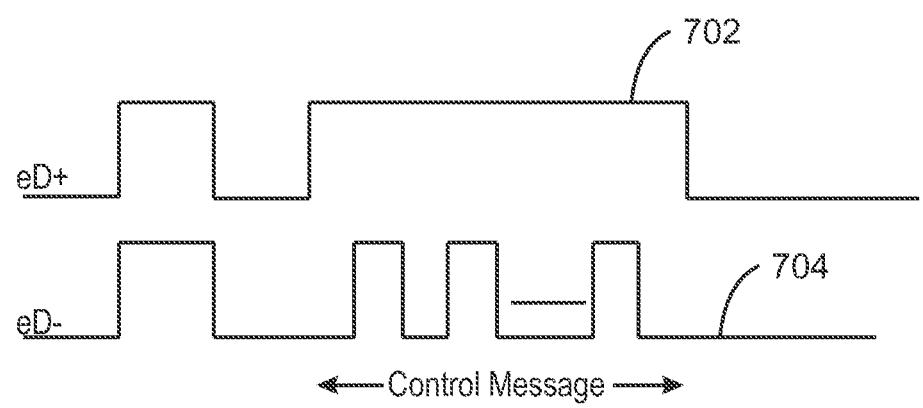
FIG. 7 is a diagram of a simplified example of control signaling used by SOC to communicate to a repeater.

As described above, the method 600 to enable software driver protocol configuration can involve the control messaging signaling discussed in FIG. 7. The software driver protocol configuration can also include support guest protocols through the eUSB 2.0 standard shown in FIGS. 1 and 2.

FIG. 7 is a diagram of a simplified example of control signaling 700 used by SOC to communicate to a repeater. A description of the differences in the signals can be included when comparing the eD+ and eD− waves of 702 and 704.

The control message represented by 702 shows a typical signal of eD+ where a first pulse is matched by the signal provided on the eD− line 704. However, on the eD+ line, the second longer pulse allows a variance on the eD− line 704 where multiple pulses are made. These additional or variant pulses may correspond to a control message.

For example, the number of pulses can correspond to a specific meaning of a control message to be used by a repeater. An example of the control messages and the corresponding pulses that may be detected by a repeater are shown in Table-1 below.

TABLE 1

Control Message Description used to detect by eUSB 2.0 Standard repeater

| No. Of Pulses in control Message Description | Description |
| --- | --- |
| 0 | Register access protocol |
| 2 | L1 Entry |
| 4 | L2 Entry |
| 6 | Disconnect indication |
| 10 | Default repeater mode |
| 12 | Host mode |
| 14 | Device mode |
| 16 | RSVD pin (Used for BSSB mode indication) |
| 18 | RSVD Pin Used for AUDIO |
| 20 | RSVD Pin Used for UART |
| 22 | Reset indication |
| 24 | RSVD Pin Used for MHL Communication |
| 28:32 | RSVD Pin used for BC1.2 Indication |

For example, based on the above table and assuming that FIG. 7, eD− line only has 22 pulses, the control message that could be detected and interpreted by the receiver would be that the repeater has reset the protocol indication for that line and source. Similarly, other numbers of pulses in the control message may correspond to other and customizable effects not shown in the above exemplary table.

Figure 8A:
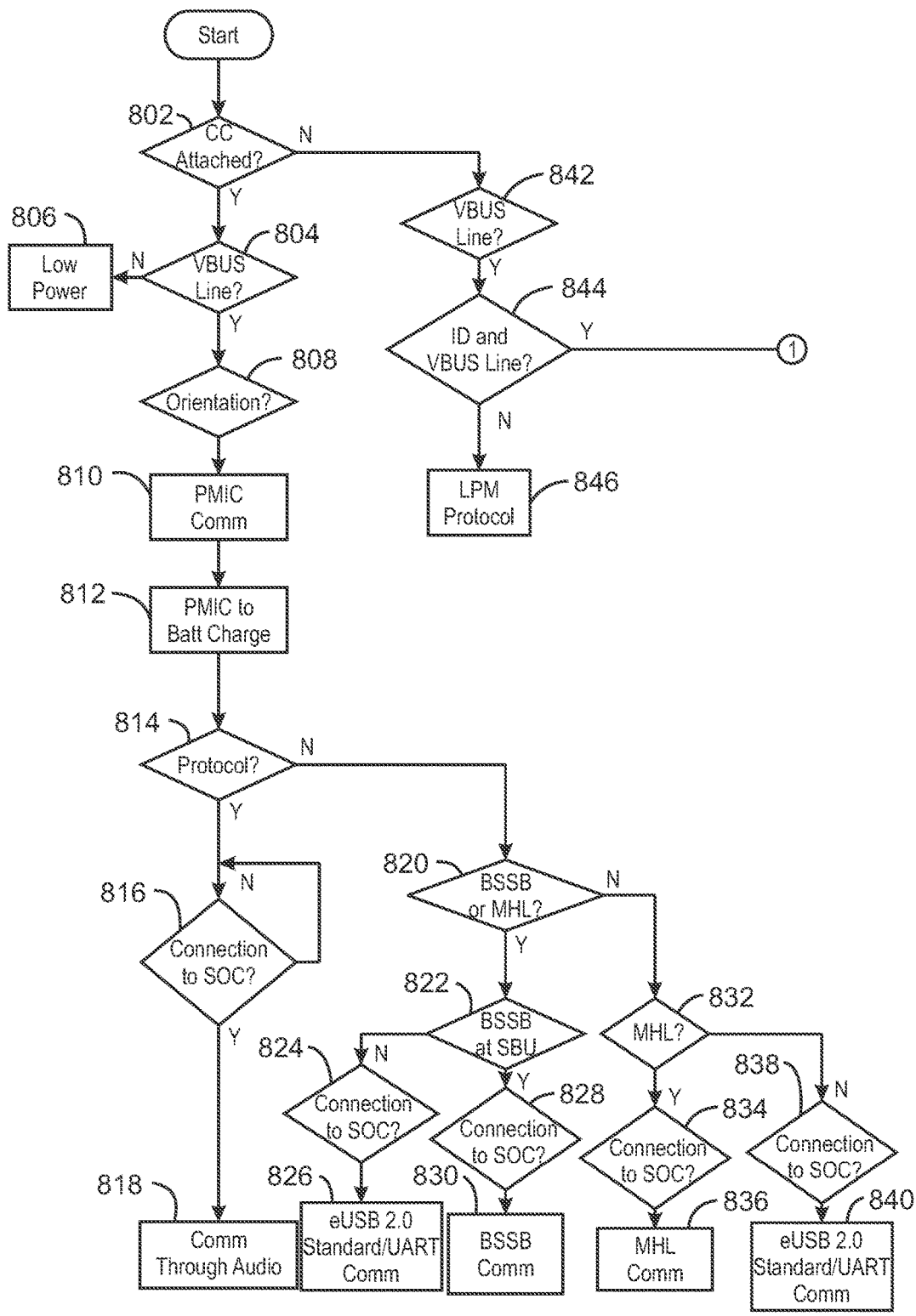
FIGS. 8A and 8B are a detailed process flow diagram of an example method of an operation of a repeater.

FIG. 8A is a process flow diagram of example method of an operation of a repeater. For ease of readability and page sizing, FIG. 8 has been broken into FIGS. 8A and 8B. Further, only the item numbers are included in each block. The method 800 may be implemented using the repeater 102 of FIG. 1 above.

Blocks 802-810 may be performed for cable detection. At block 802, the repeater may determine if communication channel pins are attached to the repeater. If yes, then the process flow may proceed to block 804. If not, then the process flow may proceed to block 842.

At block 804, the repeater may determine if the VBUS line is detected. If not, then the process flow may proceed to block 806, where the repeater can be configured in a low power mode. If the repeater does detect a VBUS line, then the process flow may proceed to block 808. At block 808, an orientation can be detected for a connected cable having both CC pins and VBUS. At block 810, the repeater can communicate to the PMIC about the attached cable. The repeater can also communicate to the SOC the orientation of the cable to allow communication from the SOC to the cable.

Blocks 812-814 can be for charging enablement. At block 812, the repeater can send an indication to the PMIC that can instruct the battery charger to start charging with default current. At block 814, it can be detected if the connection is through a CC pin for higher current protocol starting at block 816, or if there is a CC pin detection plus a VCONN detection which can indicate an audio protocol mode starting at block 820.

Blocks 816-840 can be for connection establishment and side communication. At block 816, it may be determined whether a connection has been established with the SOC transceiver. If yes, the process flow may proceed to block 818. If not, the process flow may loop until a connection is established to an SOC transceiver or otherwise halted by an end action or other actions. At block 818, a side communication through an audio protocol may begin from the repeater.

At block 820, CC pins for higher current have been detected and a contract can be established based on a Type-C connection detected through the CC pins. Based on the detection of a Type-C connection, the repeater can go into accessory mode of the Type-C USB. The process flow may proceed to both blocks 822 (pattern detector for BSSB) and 832 (an MHL pattern detector) for relatively simultaneous execution.

At block 822, a pattern detector at the repeater can determine whether a BSSB protocol is detected at the SBU pin. If not, the process flow may proceed to block 824. If the BSSB protocol is detected at the SBU pin, then the process flow may proceed to block 828. At block 824, it is determined if a connection is established with the SOC transceiver and looped until the result is yes or another action ends the loop. At block 826, an eUSB 2.0 standard/UART protocol communication can proceed. At block 828, a determination may be made as to whether a connection is established with the SOC transceiver using the BSSB protocol and looped until the result is yes or another action ends the loop. At block 830, a BSSB side communication protocol can be implemented with SOC and a BSSB adaptor.

At block 832, an MHL pattern detector on the repeater can determine if an MHL protocol is being used. If yes, then the process flow may proceeds to block 834. If not, then the process flow may proceed to block 838. At block 834, a determination may be made as to whether a connection is established with the SOC transceiver using the MHL protocol and looped until the result is yes or another action ends the loop. At block 836, MHL side communication protocol can be implemented with SOC and a connector. At block 838, a determination may be made as to whether a connection is established with the SOC transceiver and looped until the result is yes or another action ends the loop. At block 840, a eUSB 2.0 standard/UART protocol communication may proceed.

At block 842, it has been determined that a CC pin is not attached through a repeater connection. Further at block 842, a determination is made as to whether a VBUS line is detected or not. If a VBUS line is detected, then the process flow may proceed to block 844, where a determination may be made as to whether an OTG cable detected the ID line and VBUS line. If yes, then the process flow may proceed to block 846. If not, then the process flow may proceed to circle 1 which corresponds to a similar circle in FIG. 8B. At block 846, the repeater can be configured in a Link Power Management (LPM) protocol.

Figure 8B:
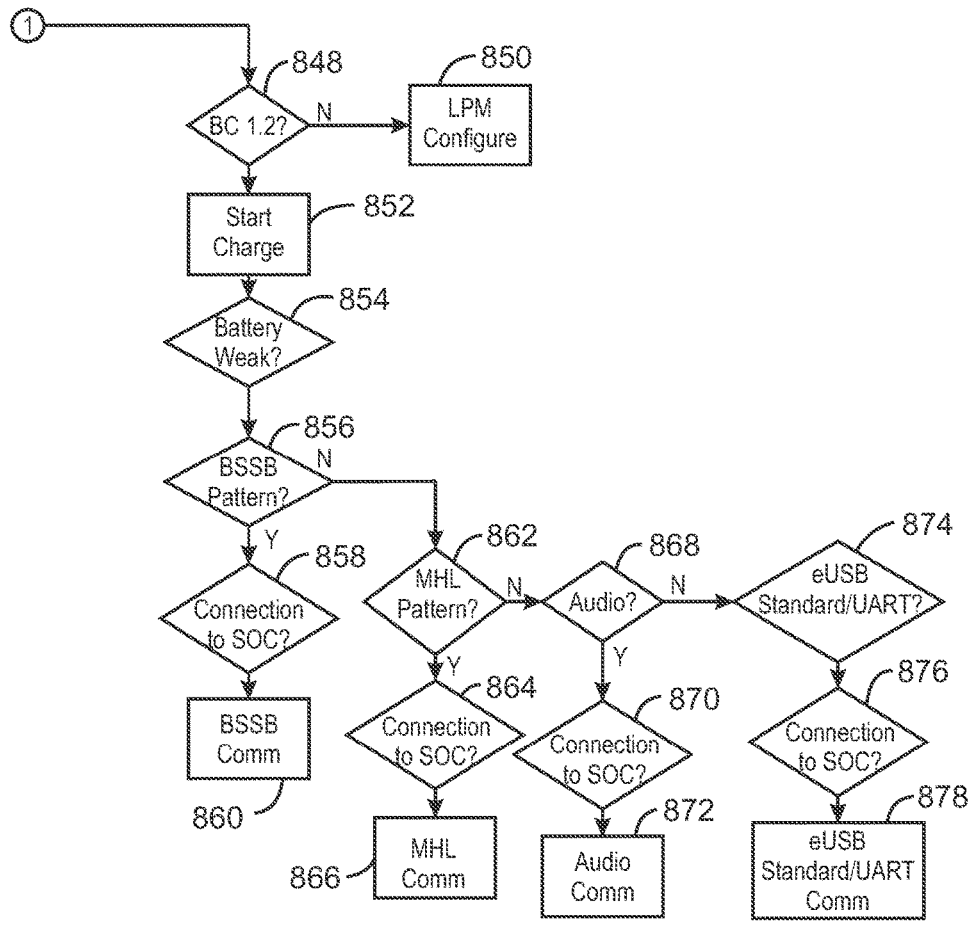

In FIG. 8B, blocks 848-854 can include B.C. 1.2 detection. At block 848, a determination may be made as to whether a battery charging is according to B.C. 1.2 protocol. If not, then the process flow may proceed to block 850. If yes, then the process flow may proceed to block 852. At block 850, the repeater can be configured in a LPM protocol. At block 852, the repeater can send an indication to the SOC and PMIC to start charging or to obtain a charge from another power source. At block 854, a determination may be made as to whether a battery is in a weak condition. If yes, then the process flow may proceed to block 856.

Blocks 856-878 can include connection establishment and side communication. At block 856, it may be determined whether a BSSB pattern is detected through the DP/DM pin. If yes, then the process flow may proceed to block 858. If not, then the process flow proceeds to block 862. At block 858, a determination is made as to whether a connection established with the SOC transceiver is using the BSSB protocol and may be looped until the result is yes or another action ends the loop. At block 860, the BSSB side communication protocol can be implemented with the SOC.

At block 862, a determination may be made as to whether an MHL pattern can be detected through the ID/CBUS pin. If yes, then the process flow may proceeds to block 864. If not, then the process flow may proceed to block 868. At block 864, a determination may be made as to whether a connection established with the SOC transceiver using the MHL protocol and may be looped until the result is yes or another action ends the loop. At block 866, MHL side communication protocol can be implemented with the SOC and the connector.

At block 868, a determination may be made as to whether an audio pattern can be detected through the DP/DM pin. If yes, then the process flow may proceed to block 870. If not, then the process flow may proceed to block 874. At block 870, a determination is made as to whether a connection established with the SOC transceiver using the audio protocol and looped until either the result is yes or another action ends the loop. At block 872, the audio communication can depend on an SOC instruction and a driver.

At block 874, it may be decided that communication will be through eUSB 2.0 Standard/UART protocols. At block 876, a determination may be made as to whether a connection established with the SOC transceiver using the eUSB 2.0 Standard/UART protocols and looped until the result is yes or another action ends the loop. At block 878, eUSB 2.0 Standard/UART communication can depend on SOC instruction and driver.

Figure 9:
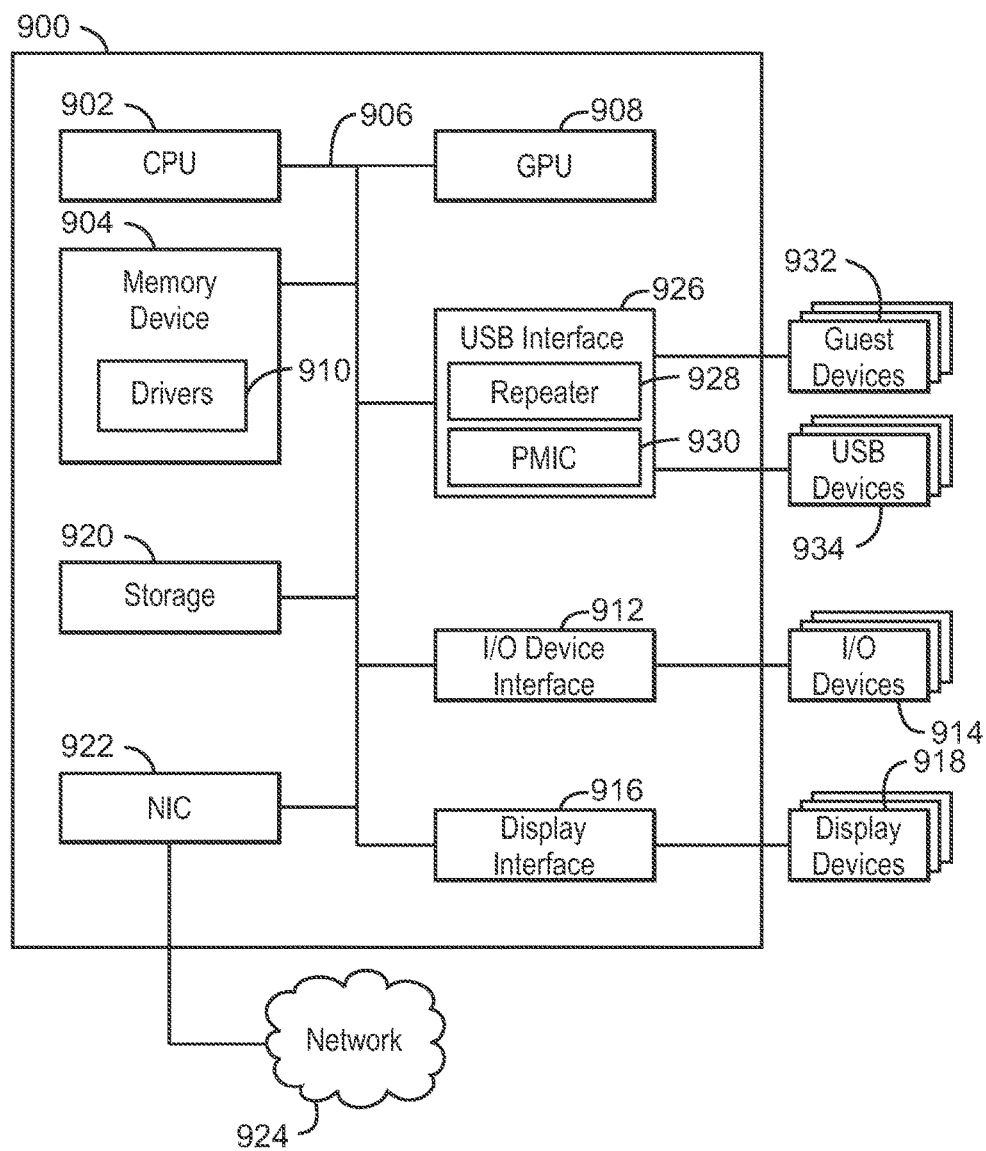
FIG. 9 is a block diagram illustrating an example computing device that can interface with various devices using a USB interface with a repeater.

FIG. 9 is a block diagram illustrating an example computing device that can interface with various devices using a USB interface with a repeater. The computing device 900 may be, for example, a laptop computer, desktop computer, tablet computer, mobile device, or server, among others. The computing device 900 may include a central processing unit (CPU) 902 that is configured to execute stored instructions, as well as a memory device 904 that stores instructions that are executable by the CPU 902. The CPU 902 may be coupled to the memory device 904 by a bus 906. Additionally, the CPU 902 can be a single core processor, a multi-core processor, a computing cluster, or any number of other configurations. Furthermore, the computing device 900 may include more than one CPU 902. The memory device 904 can include random access memory (RAM), read only memory (ROM), flash memory, or any other suitable memory systems. For example, the memory device 904 may include dynamic random access memory (DRAM).

The computing device 900 may also include a graphics processing unit (GPU) 908. As shown, the CPU 902 may be coupled through the bus 906 to the GPU 908. The GPU 908 may be configured to perform any number of graphics operations within the computing device 900. For example, the GPU 908 may be configured to render or manipulate graphics images, graphics frames, videos, or the like, to be displayed to a user of the computing device 900.

The memory device 904 can include random access memory (RAM), read only memory (ROM), flash memory, or any other suitable memory systems. For example, the memory device 904 may include dynamic random access memory (DRAM). The memory device 904 may include device drivers 910 that are configured to execute the instructions for device discovery. The device drivers 910 may be software, an application program, application code, or the like.

The CPU 902 may also be connected through the bus 906 to an input/output (I/O) device interface 912 configured to connect the computing device 900 to one or more I/O devices 914. The I/O devices 914 may include, for example, a keyboard and a pointing device, wherein the pointing device may include a touchpad or a touchscreen, among others. The I/O devices 914 may be built-in components of the computing device 900, or may be devices that are externally connected to the computing device 900. In some examples, the memory 904 may be communicatively coupled to I/O devices 914 through direct memory access (DMA).

The CPU 902 may also be linked through the bus 906 to a display interface 916 configured to connect the computing device 900 to a display device 918. The display device 918 may include a display screen that is a built-in component of the computing device 900. The display device 918 may also include a computer monitor, television, or projector, among others, that is internal to or externally connected to the computing device 900.

The computing device also includes a storage device 920. The storage device 920 is a physical memory such as a hard drive, an optical drive, a thumbdrive, an array of drives, or any combinations thereof. The storage device 920 may also include remote storage drives.

The computing device 900 may also include a network interface controller (NIC) 922. The NIC 922 may be configured to connect the computing device 900 through the bus 906 to a network 924. The network 924 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The CPU 902 may also be linked through the bus 906 to an USB interface 926 configured to connect the computing device 900 to any number of guest devices 932 and USB devices 934. For example, the USB devices 934 can include USB 2.0 devices. In some examples, the guest devices 932 can be devices that implement protocols such as mobile high-definition link (MHL), a universal asynchronous receiver/transmitter (UART), a Digital Audio, or an embedded universal serial bus (eUSB) protocol, among other possible guest protocols. For example, the USB interface 926 can be connected to the guest devices 930 and the USB devices 932 via any suitable connection, such as a Type-C USB connection.

The USB interface 926 may include a repeater 928. In some examples, the repeater 928 may include logic to receive packets from a first transceiver. The repeater 928 may also include logic to detect a pattern in the packets to identify a guest protocol. For example, the repeater 928 may include a pattern detector to detect the pattern in the packets. The repeater may further include logic to send the packets from the first transceiver to the SOC via a second transceiver based on the identified guest protocol. For example, the first transceiver may be a high voltage universal serial bus (USB) 2.0 transceiver and the second transceiver may be a low voltage embedded universal serial bus (eUSB) 2.0 transceiver. In some examples, the repeater can detect a high voltage analog connection and configure the second transceiver into a guest mode. The repeater 928 may also include a battery charging type detector to detect a battery charging (BC) type and a low voltage transceiver for communication with the SOC and a power management integrated circuit (PMIC). In some examples, the repeater 928 can include a Type-C high voltage detector to detect the connection of a Type-C cable. In some examples, the repeater can also start a functional communication protocol based on a received control message from a driver driven by the processor. For example, the function communication protocol may be a native USB 2.0 communication protocol.

The USB interface 926 may also include a power management integrated circuit (PMIC) 930 communicatively connected to the repeater 928. In some examples, the PMIC 930 can manage power of the system in response to receiving low voltage control signals from the repeater 928.

The block diagram of FIG. 9 is not intended to indicate that the computing device 900 is to include all of the components shown in FIG. 9. Rather, the computing device 900 can include fewer or additional components not illustrated in FIG. 9, such as additional USB devices, additional guest devices, and the like. The computing device 900 may include any number of additional components not shown in FIG. 9, depending on the details of the specific implementation. Furthermore, any of the functionalities of the CPU 902 may be partially, or entirely, implemented in hardware and/or in a processor.

Figure 10:
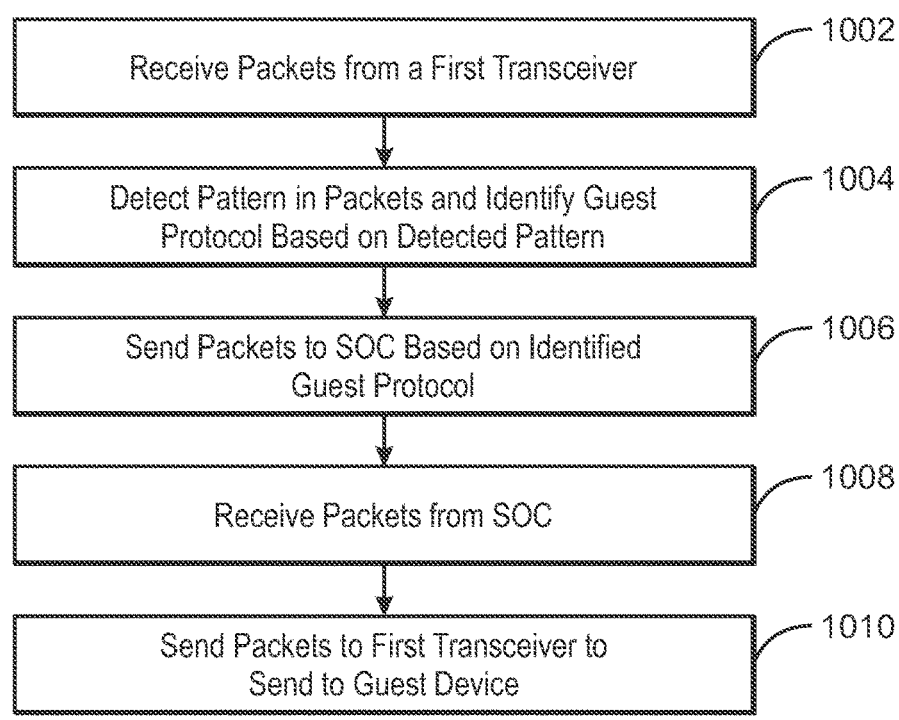
FIG. 10 is a flow chart illustrating a method for side band communication.

FIG. 10 is a flow chart illustrating a method for side band communication. The example method is generally referred to by the reference number 1000 and can be implemented using the repeater 928 of FIG. 9 above.

At block 1002, the repeater receives packets from a first receiver. For example, the first receiver may be a USB 2.0 receiver. In some examples, the repeater may also detect a cable type of a Type-C universal serial bus (USB) and establish a connection to the SOC to enable a side communication channel through the Type-C USB cable.

At block 1004, the repeater detects a pattern in the packets and identifies a guest protocol based on the detected pattern. For example, the guest protocol may be a mobile high-definition link (MHL), a universal asynchronous receiver/transmitter (UART), digital audio, or embedded USB protocol.

At block 1006, the repeater sends packets to a system-on-chip (SOC) based on the identified guest protocol. For example, the repeater may send the packets via a low voltage eUSB 2.0 transceiver. In some examples, the repeater may perform a side communication through an audio channel based on detection through a configuration channel (CC) pin and a pulldown resistor (Ra) connected to the CC pin. In some examples, the repeater may perform a side communication through at least one of a mobile high-definition link (MHL), a universal asynchronous receiver/transmitter (UART), digital audio or embedded USB protocol, in response to not detecting an audio channel. In some examples, the repeater may establish a connection to the SOC in response to detecting a battery charging (BC) type and perform side communication through data plus (DP) and data minus (DM) pins of a BC type cable. In some examples, the repeater can establish a connection with the SOC by enabling a driver of the repeater based on a received acknowledgment message through a data connection. In some examples, the repeater can establish a connection with the SOC by enabling a driver of the repeater based on a received acknowledgment message through a data connection. In some examples, the repeater may initiate side communication by configuring a repeater driver.

In some examples, the repeater may receive packets from the SOC. For example, the repeater can forward a packet to a DP/DM line in response to a receiving the packet from the SOC via an embedded data positive (eD+) and embedded data negative (eD−) line.

In some examples, the repeater can further initiate functional communication based on a received control message from a driver driven by the SOC. For example, the functional communication may be with one or more USB devices.

This process flow diagram is not intended to indicate that the blocks of the example process 1000 are to be executed in any particular order, or that all of the blocks are to be included in every case. Further, any number of additional blocks not shown may be included within the example process 1000, depending on the details of the specific implementation.

Figure 11:
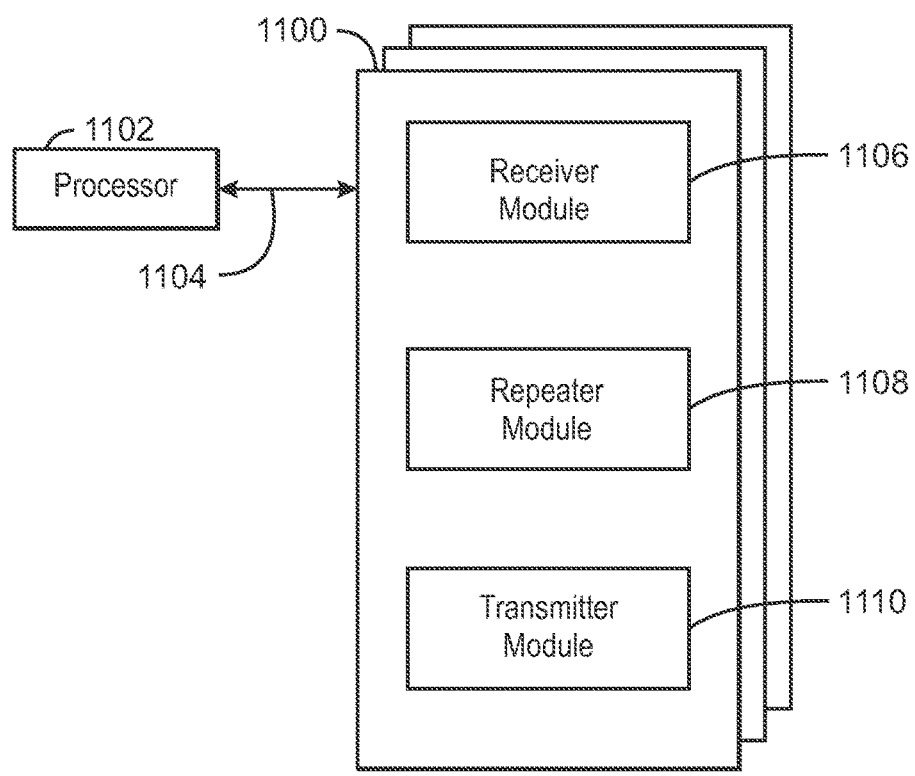
FIG. 11 is a block diagram showing computer readable media 1100 that store code for communicating through sideband communications.

FIG. 11 is a block diagram showing computer readable media 1100 that store code for communicating through sideband communications. The computer readable media 1100 may be accessed by a processor 1102 over a computer bus 1104. Furthermore, the computer readable medium 1100 may include code configured to direct the processor 1102 to perform the methods described herein. In some embodiments, the computer readable media 1100 may be non-transitory computer readable media. In some examples, the computer readable media 1100 may be storage media. However, in any case, the computer readable media do not include transitory media such as carrier waves, signals, and the like.

The block diagram of FIG. 11 is not intended to indicate that the computer readable media 1100 is to include all of the components shown in FIG. 11. Further, the computer readable media 1100 may include any number of additional components not shown in FIG. 11, depending on the details of the specific implementation.

The various software components discussed herein may be stored on one or more computer readable media 1100, as indicated in FIG. 11. For example, a receiver module 1106 may be configured to receive packets from a first transceiver. For example, the first transceiver may be a USB 2.0 transceiver. The packets may be data packets. For example, the data packets may be from a guest device using a Type-C cable implemented via a guest protocol. A repeater module 1108 may detect a pattern in the packets to identify a guest protocol. For example, the guest protocol may be mobile high-definition link (MHL), a universal asynchronous receiver/transmitter (UART), digital audio, Thunderbolt™ or embedded USB protocol. A transmitter module 1110 may send the packets from the first transceiver to the SOC via a second transceiver based on the identified guest protocol. For example, the second transceiver may be a low-voltage eUSB 2.0 transceiver.

In some examples, the repeater module 1108 can establish a connection to the processor in response to detecting a Type-C cable. In some examples, the repeater module 1108 can perform a side communication through an audio channel based on detection through a configuration channel (CC) pin and a pulldown resistor (Ra) connected to the CC pin. In some examples, the repeater module 1108 can perform side communication through at least one of a mobile high-definition link (MHL), a universal asynchronous receiver/ transmitter (UART), digital audio, or embedded USB protocol, if no audio channel is detected. In some examples, the repeater module 1108 can establish connection to the processor and perform side communication through data plus (DP) and data minus (DM) pins of a battery charging (BC) cable type in response to detecting the BC cable type.

In some examples, the repeater module 1108 can establish a connection with the SOC by enabling a driver based on a received acknowledgment message through a data connection. In some examples, the repeater module 1108 can establish a connection with the SOC by enabling a driver of the repeater based on a received acknowledgment message through a data connection. In some examples, the repeater module 1108 can forward a packet to a DP/DM line in response to a received packet from an embedded data positive (eD+) and embedded data negative (eD−) line. In some examples, the repeater module 1108 can initiate side communication based on the repeater configuring a repeater driver. In some examples, the repeater module 1108 can initiate functional communication based on a received control message from a driver driven by the processor.

The block diagram of FIG. 11 is not intended to indicate that the computer readable media 1100 is to include all of the components shown in FIG. 11. Further, the computer readable media 1100 may include any number of additional components not shown in FIG. 11, depending on the details of the specific implementation.

EXAMPLES

Example 1 is a system for side band communication. The system includes a processor. The system includes a system-on-chip (SOC). The system includes a repeater communicatively coupled to the processor and the SOC. The repeater can receive packets from a first transceiver. The repeater can detect a pattern in the packets to identify a guest protocol. The repeater can send the packets from the first transceiver to the SOC via a second transceiver based on the identified guest protocol.

Example 2 includes the system of example 1, including or excluding optional features. In this example, the system includes a power management integrated circuit (PMIC) communicatively connected to the repeater to manage power of the system in response to receipt of low voltage control signals from the repeater.

Example 3 includes the system of any one of examples 1 to 2, including or excluding optional features. In this example, the repeater is to detect a high voltage analog connection and configure the second transceiver into a guest mode.

Example 4 includes the system of any one of examples 1 to 3, including or excluding optional features. In this example, the guest protocol comprises at least one of a mobile high-definition link (MHL), a universal asynchronous receiver/transmitter (UART), a Digital Audio, or an embedded universal serial bus (eUSB) protocol.

Example 5 includes the system of any one of examples 1 to 4, including or excluding optional features. In this example, the first transceiver comprises a universal serial bus (USB) 2.0 transceiver and the second transceiver comprises an embedded universal serial bus (eUSB) 2.0 transceiver.

Example 6 includes the system of any one of examples 1 to 5, including or excluding optional features. In this example, the repeater comprises a battery charging type detector to detect a battery charging (BC) type.

Example 7 includes the system of any one of examples 1 to 6, including or excluding optional features. In this example, the repeater comprises a low voltage transceiver for communication with the SOC and a power management integrated circuit (PMIC).

Example 8 includes the system of any one of examples 1 to 7, including or excluding optional features. In this example, the repeater comprises a Type-C high voltage detector to detect the connection of a Type-C cable.

Example 9 includes the system of any one of examples 1 to 8, including or excluding optional features. In this example, the repeater comprises a pattern detector to detect the pattern in the packets.

Example 10 includes the system of any one of examples 1 to 9, including or excluding optional features. In this example, system of any combination of claims 1-5, the repeater to start a functional communication protocol based on a received control message from a driver driven by the processor.

Example 11 is a method for side band communication. The method includes receiving packets from a first receiver. The method includes detecting a pattern in the packets and identifying a guest protocol based on the detected pattern. The method includes sending packets to a system-on-chip (SOC) based on the identified guest protocol.

Example 12 includes the method of example 11, including or excluding optional features. In this example, the method includes detecting a cable type of a Type-C universal serial bus (USB) and establishing a connection to the SOC to enable a side communication channel through the Type-C USB cable.

Example 13 includes the method of any one of examples 11 to 12, including or excluding optional features. In this example, the method includes performing a side communication through an audio channel based on detection through a configuration channel (CC) pin and a pulldown resistor (Ra) connected to the CC pin.

Example 14 includes the method of any one of examples 11 to 13, including or excluding optional features. In this example, the method includes in response to not detecting an audio channel, performing a side communication through at least one of a mobile high-definition link (MHL), a universal asynchronous receiver/transmitter (UART), digital Audio or embedded USB protocol.

Example 15 includes the method of any one of examples 11 to 14, including or excluding optional features. In this example, the method includes establishing connection to the processor in response to detecting a battery charging (BC) type and performing side communication through data plus (DP) and data minus (DM) pins of the BC cable type.

Example 16 includes the method of any one of examples 11 to 15, including or excluding optional features. In this example, the method includes establishing a connection with the SOC by enabling a driver of a repeater based on a received acknowledgment message through a data connection.

Example 17 includes the method of any one of examples 11 to 16, including or excluding optional features. In this example, the method includes establishing a connection with the SOC by enabling a driver of a repeater based on a received acknowledgment message through a data connection.

Example 18 includes the method of any one of examples 11 to 17, including or excluding optional features. In this example, the method includes forwarding a packet to a DP/DM line in response receiving the packet from the SOC via an embedded data positive (eD+) and embedded data negative (eD−) line.

Example 19 includes the method of any one of examples 11 to 18, including or excluding optional features. In this example, the method includes initiating side communication by configuring a repeater driver.

Example 20 includes the method of any one of examples 11 to 19, including or excluding optional features. In this example, the method includes initiating functional communication based on a received control message from a driver driven by the SOC.

Example 21 is a tangible, non-transitory, computer-readable medium comprising instructions that, when executed by a processor, direct the processor to communicate through sideband communications. The computer-readable medium includes instructions that direct the processor to receive packets from a first transceiver. The computer-readable medium includes instructions that direct the processor to detect a pattern in the packets to identify a guest protocol. The computer-readable medium includes instructions that direct the processor to send the packets from the first transceiver to the SOC via a second transceiver based on the identified guest protocol.

Example 22 includes the computer-readable medium of example 21, including or excluding optional features. In this example, the computer-readable medium includes instructions to direct the processor to establish a connection to the processor in response to detecting a Type-C cable.

Example 23 includes the computer-readable medium of any one of examples 21 to 22, including or excluding optional features. In this example, the computer-readable medium includes instructions to direct the processor to perform a side communication through an audio channel based on detection through a configuration channel (CC) pin and a pulldown resistor (Ra) connected to the CC pin.

Example 24 includes the computer-readable medium of any one of examples 21 to 23, including or excluding optional features. In this example, the computer-readable medium includes instructions to direct the processor to perform side communication through at least one of a mobile high-definition link (MHL), a universal asynchronous receiver/transmitter (UART), digital audio, or embedded USB protocol, in response to no audio channel being detected.

Example 25 includes the computer-readable medium of any one of examples 21 to 24, including or excluding optional features. In this example, the computer-readable medium includes instructions to direct the processor to establish connection to the processor and perform side communication through data plus (DP) and data minus (DM) pins of a battery charging (BC) cable type in response to a detection of a BC cable type.

Example 26 includes the computer-readable medium of any one of examples 21 to 25, including or excluding optional features. In this example, the computer-readable medium includes instructions to direct the processor to establish a connection with the SOC by enabling a driver based on a received acknowledgment message through a data connection.

Example 27 includes the computer-readable medium of any one of examples 21 to 26, including or excluding optional features. In this example, the computer-readable medium includes instructions to direct the processor to establish a connection with the SOC by enabling a driver of the repeater based on a received acknowledgment message through a data connection.

Example 28 includes the computer-readable medium of any one of examples 21 to 27, including or excluding optional features. In this example, the computer-readable medium includes instructions to direct the processor to forward a packet to a DP/DM line in response to a received packet from an embedded data positive (eD+) and embedded data negative (eD−) line.

Example 29 includes the computer-readable medium of any one of examples 21 to 28, including or excluding optional features. In this example, the computer-readable medium includes instructions to direct the processor to initiate side communication based on configuring configuration of a repeater driver by the repeater.

Example 30 includes the computer-readable medium of any one of examples 21 to 29, including or excluding optional features. In this example, the computer-readable medium includes instructions to direct the processor to initiate functional communication based on a received control message from a driver driven by the processor.

Example 31 is an apparatus for side band communication. The apparatus includes logic to receive packets from a first transceiver. The apparatus includes logic to detect a pattern in the packets to identify a guest protocol. The apparatus includes logic to send the packets from the first transceiver to the SOC via a second transceiver based on the identified guest protocol.

Example 32 includes the apparatus of example 31, including or excluding optional features. In this example, the apparatus includes logic to communicate with a power management integrated circuit (PMIC) to manage power of the system in response to received low voltage control signals from the repeater.

Example 33 includes the apparatus of any one of examples 31 to 32, including or excluding optional features. In this example, the apparatus includes logic to detect a high voltage analog connection and configure the second transceiver into a guest mode.

Example 34 includes the apparatus of any one of examples 31 to 33, including or excluding optional features. In this example, the guest protocol comprises at least one of a mobile high-definition link (MHL), a universal asynchronous receiver/transmitter (UART), a Digital Audio, or an embedded universal serial bus (eUSB) protocol.

Example 35 includes the apparatus of any one of examples 31 to 34, including or excluding optional features. In this example, the first transceiver comprises a universal serial bus (USB) 2.0 transceiver and the second transceiver comprises an embedded universal serial bus (eUSB) 2.0 transceiver.

Example 36 includes the apparatus of any one of examples 31 to 35, including or excluding optional features. In this example, the apparatus includes a battery charging type detector to detect a battery charging (BC) type.

Example 37 includes the apparatus of any one of examples 31 to 36, including or excluding optional features. In this example, the apparatus includes a low voltage transceiver for communication with the SOC and a power management integrated circuit (PMIC).

Example 38 includes the apparatus of any one of examples 31 to 37, including or excluding optional features. In this example, the apparatus includes a Type-C high voltage detector to detect the connection of a Type-C cable.

Example 39 includes the apparatus of any one of examples 31 to 38, including or excluding optional features. In this example, the apparatus includes a pattern detector to detect the pattern in the packets.

Example 40 includes the apparatus of any one of examples 31 to 39, including or excluding optional features. In this example, the apparatus includes logic to start a functional communication protocol based on a received control message from a driver driven by the processor.

Example 41 is a system for side band communication. The system includes means for receiving packets from a first transceiver. The system includes means for detecting a pattern in the packets to identify a guest protocol. The system includes means for sending the packets from the first transceiver to the SOC via a second transceiver based on the identified guest protocol.

Example 42 includes the system of example 41, including or excluding optional features. In this example, the system includes a means for managing power of the system in response to receiving low voltage control signals from the repeater.

Example 43 includes the system of any one of examples 41 to 42, including or excluding optional features. In this example, the system includes means for detecting a high voltage analog connection and means for configuring the second transceiver into a guest mode.

Example 44 includes the system of any one of examples 41 to 43, including or excluding optional features. In this example, the guest protocol comprises at least one of a mobile high-definition link (MHL), a universal asynchronous receiver/transmitter (UART), a Digital Audio, or an embedded universal serial bus (eUSB) protocol.

Example 45 includes the system of any one of examples 41 to 44, including or excluding optional features. In this example, the first transceiver comprises a universal serial bus (USB) 2.0 transceiver and the second transceiver comprises an embedded universal serial bus (eUSB) 2.0 transceiver.

Example 46 includes the system of any one of examples 41 to 45, including or excluding optional features. In this example, the system includes means for detecting a battery charging (BC) type.

Example 47 includes the system of any one of examples 41 to 46, including or excluding optional features. In this example, the system includes means for communicating with a system-on-chip (SOC) and a power management integrated circuit (PMIC).

Example 48 includes the system of any one of examples 41 to 47, including or excluding optional features. In this example, the system includes means for detecting the connection of a Type-C cable.

Example 49 includes the system of any one of examples 41 to 48, including or excluding optional features. In this example, the means for detecting a pattern comprises a repeater comprising a pattern detector.

Example 50 includes the system of any one of examples 41 to 49, including or excluding optional features. In this example, the system includes means for starting a functional communication protocol based on a received control message from a driver driven by the processor.

While the present techniques have been described with respect to a limited number of embodiments, those skilled in the art can appreciate numerous modifications and variations therefrom. It is intended that the appended claims cover all such modifications and variations as fall within the true spirit and scope of this present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In the foregoing specification, a detailed description has been given with reference to specific embodiments. It can, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other language does not necessarily refer to the same embodiment or the same example, but may refer to different and distinct embodiments, as well as potentially the same embodiment.

What is claimed is:

1. A system for side band communication comprising:
a processor;
a system-on-chip (SOC); and
a repeater communicatively coupled to the processor and the SOC, the repeater to:
receive packets from a first transceiver;
detect a pattern in the packets to identify a guest protocol, not natively supported by the repeater that uses data plus (DP) and data minus (DM) pins for data transmission; and
send the packets from the first transceiver to the SOC via a second transceiver based on the identified guest protocol.

2. The system of claim 1, further comprising a power management integrated circuit (PMIC) communicatively connected to the repeater to manage power of the system in response to receipt of low voltage control signals from the repeater.

3. The system of claim 1, wherein the repeater is to detect a high voltage analog connection and configure the second transceiver into a guest mode.

4. The system of claim 1, wherein the guest protocol comprises at least one of a mobile high-definition link (MHL), a universal asynchronous receiver/transmitter (UART), or a Digital Audio, where the guest protocol is not natively supported by pins in the system and instead the pins may be connected to high speed switches acting as multiplexers on the data plus and data minus signal paths for handling the guest protocol detected.

5. The system of claim 1, wherein the first transceiver comprises a universal serial bus (USB) 2.0 transceiver and the second transceiver comprises an embedded universal serial bus (eUSB) 2.0 transceiver.

6. The system of claim 1, wherein the repeater comprises a battery charging type detector to detect a battery charging (BC) type.

7. The system of claim 1, wherein the repeater comprises a low voltage transceiver for communication with the SOC and a power management integrated circuit (PMIC).

8. The system of claim 1, wherein the repeater comprises a Type-C high voltage detector to detect the connection of a Type-C cable.

9. The system of claim 1, wherein the repeater comprises a pattern detector to detect the pattern in the packets.

10. The system of claim 1, the repeater to start a functional communication protocol based on a received control message from a driver driven by the processor.

11. A method for side band communication comprising:
receiving packets from a first receiver;
detecting a pattern in the packets and identifying a guest protocol based on the detected pattern, where the guest protocol is not natively supported by a repeater and uses data plus (DP) and data minus (DM) pins for data transmission; and
sending packets to a system-on-chip (SOC) based on the identified guest protocol.

12. The method of claim 11, comprising detecting a cable type of a Type-C universal serial bus (USB) and establishing a connection to the SOC to enable a side communication channel through the Type-C USB cable.

13. The method of claim 11, comprising performing a side communication through an audio channel based on detection through a configuration channel (CC) pin and a pulldown resistor (Ra) connected to the CC pin.

14. The method of claim 11, comprising, in response to not detecting an audio channel, performing a side communication through at least one of a mobile high-definition link (MHL), or a universal asynchronous receiver/transmitter (UART), digital audio—where the guest protocol is not natively supported by pins in the system and instead the pins may be connected to high speed switches acting as multiplexers on the data plus and data minus signal paths for handling the guest protocol detected.

15. The method of claim 11, comprising establishing connection to the SOC in response to detecting a battery charging (BC) type and performing side communication through data plus (DP) and data minus (DM) pins of a BC type cable.

16. The method of claim 11, comprising establishing a connection with the SOC by enabling a driver of a repeater based on a received acknowledgment message through a data connection.

17. The method of claim 11, comprising establishing a connection with the SOC by enabling a driver of a repeater based on a received acknowledgment message through a data connection.

18. The method of claim 11, comprising forwarding a packet to a DP/DM line in response to receiving the packet from the SOC via an embedded data positive (eD+) and embedded data negative (eD−) line.

19. The method of claim 11, comprising initiating side communication by configuring a repeater driver.

20. The method of claim 11, comprising initiating functional communication based on a received control message from a driver driven by the SOC.

21. A tangible, non-transitory, computer-readable medium comprising instructions that, when executed by a processor, direct the processor to communicate through sideband communications, the instructions to direct the processor to:
receive packets from a first transceiver;
detect a pattern in the packets to identify a guest protocol, not natively supported by a repeater, that uses data plus (DP) and data minus (DM) pins for data transmission; and
send the packets from the first transceiver to the SOC via a second transceiver based on the identified guest protocol.

22. The computer-readable medium of claim 21, comprising instructions to direct the processor to establish a connection to the processor in response to detection of a Type-C cable.

23. The computer-readable medium of claim 21, comprising instructions to direct the processor to perform a side communication through an audio channel based on detection through a configuration channel (CC) pin and a pulldown resistor (Ra) connected to the CC pin.

24. The computer-readable medium of claim 21, comprising instructions to direct the processor to perform side communication through at least one of a mobile high-definition link (MHL), a universal asynchronous receiver/transmitter (UART), or digital audio, in response to no audio channel being detected, where the guest protocol is not natively supported by pins in the system and instead the pins may be connected to high speed switches acting as multiplexers on the data plus and data minus signal paths for handling the guest protocol detected.

25. The computer-readable medium of claim 21, comprising instructions to direct the processor to perform side communication through data plus (DP) and data minus (DM) pins of a battery charging (BC) cable type in response to a detection of a BC cable type.

* * * * *